US009733903B2

(12) United States Patent
Bates et al.

(10) Patent No.: US 9,733,903 B2
(45) Date of Patent: *Aug. 15, 2017

(54) OPTIMIZING PROGRAM PERFORMANCE WITH ASSERTION MANAGEMENT

(71) Applicant: International Business Machines Corporation, Armonk, NY (US)

(72) Inventors: Cary L. Bates, Rochester, MN (US); Lee Helgeson, Rochester, MN (US); Justin K. King, Rochester, MN (US); Michelle A. Schlicht, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,162

(22) Filed: Dec. 19, 2014

(65) Prior Publication Data

US 2016/0179478 A1   Jun. 23, 2016

Related U.S. Application Data

(63) Continuation of application No. 14/574,459, filed on Dec. 18, 2014.

(51) Int. Cl.
  *G06F 9/44* (2006.01)
  *G06F 9/45* (2006.01)
(52) U.S. Cl.
  CPC .......... *G06F 8/34* (2013.01); *G06F 8/70* (2013.01); *G06F 8/73* (2013.01); *G06F 8/41* (2013.01)
(58) Field of Classification Search
  None
  See application file for complete search history.

(56) References Cited

U.S. PATENT DOCUMENTS 5,487,134 A * 1/1996 Ballard ............... G06F 17/5045
706/46
5,544,305 A   8/1996 Ohmaye et al.
(Continued)

FOREIGN PATENT DOCUMENTS

JP   2008276556 A   11/2008
WO  2011042730 A1   4/2011

OTHER PUBLICATIONS

Hermenegildo, "Using Global Analysis, Partial Specifications, and an Extensible Assertion Language for Program Validation and Debugging", 1999, Logic Programming Paradigm.*
(Continued)

*Primary Examiner* — Wei Zhen
*Assistant Examiner* — Hossain Morshed
(74) *Attorney, Agent, or Firm* — Patterson + Sheridan, LLP

(57) ABSTRACT

The present disclosure relates to maintaining assertions in source code components of a development project by an integrated development environment (IDE) tool. According to one embodiment, a request is received to build a software application generated from the development project. Based on prior executions of the software application, resource requirements for each of one or more assertions included in the prior executions of the software application are identified. One or more of the assertions based on the identified resource requirements are selectively inserted in the source code components. The source code components of the development project are compiled to build the software application.

5 Claims, 10 Drawing Sheets

(56) References Cited

U.S. PATENT DOCUMENTS

| | | | |
|---|---|---|---|
| 6,117,180 A * | 9/2000 | Dave | G06F 9/4887 |
| | | | 703/2 |
| 6,457,176 B1 | 9/2002 | King | |
| 6,701,518 B1 * | 3/2004 | Dwyer | G06F 8/52 |
| | | | 714/E11.209 |
| 6,848,088 B1 * | 1/2005 | Levitt | G06F 17/504 |
| | | | 703/2 |
| 6,883,166 B1 * | 4/2005 | Thompson | G06F 8/447 |
| | | | 714/E11.209 |
| 7,322,026 B2 * | 1/2008 | Ahluwalia | G06F 11/3672 |
| | | | 714/E11.207 |
| 7,426,705 B1 * | 9/2008 | Kolaric | G06F 17/5045 |
| | | | 716/128 |
| 7,467,712 B2 | 12/2008 | Carroscia | |
| 7,603,659 B2 | 10/2009 | Blumenthal et al. | |
| 7,908,602 B2 | 3/2011 | Alcorn et al. | |
| 8,117,591 B1 | 2/2012 | Michelsen | |
| 8,117,610 B2 | 2/2012 | Mitchell | |
| 8,281,288 B1 | 10/2012 | Spencer | |
| 8,516,533 B2 | 8/2013 | Davis et al. | |
| 8,571,538 B2 | 10/2013 | Sprigg et al. | |
| 8,635,204 B1 | 1/2014 | Xie et al. | |
| 8,826,230 B1 | 9/2014 | Michelsen | |
| 8,843,910 B1 | 9/2014 | Schwerin et al. | |
| 8,850,391 B1 | 9/2014 | Lin et al. | |
| 9,417,990 B2 | 8/2016 | Michelsen | |
| 9,536,093 B2 | 1/2017 | Hawblitzel et al. | |
| 9,547,483 B1 | 1/2017 | Boxall et al. | |
| 2003/0110472 A1 | 6/2003 | Alloing et al. | |
| 2004/0117771 A1 * | 6/2004 | Venkatapathy | G06F 11/3624 |
| | | | 717/130 |
| 2004/0128584 A1 * | 7/2004 | Mandava | G06F 11/3676 |
| | | | 714/38.14 |
| 2004/0186817 A1 | 9/2004 | Thames et al. | |
| 2004/0261059 A1 | 12/2004 | Spencer et al. | |
| 2005/0055605 A1 * | 3/2005 | Blumenthal | G06F 11/362 |
| | | | 714/13 |
| 2005/0204345 A1 * | 9/2005 | Rivera | G06F 11/3624 |
| | | | 717/127 |
| 2005/0229154 A1 | 10/2005 | Hiew et al. | |
| 2005/0246693 A1 | 11/2005 | Plum | |
| 2006/0031807 A1 * | 2/2006 | Abramovici | G01R 31/318533 |
| | | | 716/106 |
| 2006/0075304 A1 * | 4/2006 | Canning | G06F 11/0748 |
| | | | 714/38.11 |
| 2006/0179425 A1 | 8/2006 | Scougall et al. | |
| 2006/0236319 A1 | 10/2006 | Pinnix et al. | |
| 2006/0271917 A1 | 11/2006 | Das et al. | |
| 2006/0294502 A1 | 12/2006 | Das et al. | |
| 2007/0043760 A1 | 2/2007 | Johannes Maria Meijer et al. | |
| 2007/0294651 A1 * | 12/2007 | Tsai | G06F 17/5022 |
| | | | 716/102 |
| 2008/0066030 A1 * | 3/2008 | Hekmatpour | G06F 17/5022 |
| | | | 716/102 |
| 2008/0098366 A1 * | 4/2008 | Fong | G06F 17/505 |
| | | | 717/135 |
| 2008/0127101 A1 | 5/2008 | Anafi et al. | |
| 2008/0134142 A1 | 6/2008 | Nathan et al. | |
| 2008/0250325 A1 | 10/2008 | Feigenbaum et al. | |
| 2008/0270980 A1 | 10/2008 | Ahadian et al. | |
| 2008/0276556 A1 | 11/2008 | Flint et al. | |
| 2009/0064111 A1 | 3/2009 | Kornerup et al. | |
| 2009/0070734 A1 | 3/2009 | Dixon et al. | |
| 2009/0172529 A1 * | 7/2009 | Jas | G06F 11/261 |
| | | | 715/700 |
| 2009/0193398 A1 | 7/2009 | Mitchell | |
| 2009/0204931 A1 * | 8/2009 | Lim | G06F 17/5027 |
| | | | 716/106 |
| 2009/0215018 A1 | 8/2009 | Edmondson et al. | |
| 2010/0122234 A1 | 5/2010 | Le Bars et al. | |
| 2010/0153915 A1 | 6/2010 | Schneider | |
| 2010/0162209 A1 | 6/2010 | Brown et al. | |
| 2010/0169874 A1 | 7/2010 | Izard et al. | |
| 2010/0175052 A1 | 7/2010 | Prasad et al. | |
| 2010/0218174 A1 | 8/2010 | Schneider | |
| 2010/0325262 A1 * | 12/2010 | Allen | H04L 69/32 |
| | | | 709/224 |
| 2011/0145788 A1 | 6/2011 | Xu et al. | |
| 2011/0197176 A1 | 8/2011 | Muharsky et al. | |
| 2012/0222014 A1 | 8/2012 | Peretz et al. | |
| 2012/0278738 A1 | 11/2012 | Kruse et al. | |
| 2012/0278791 A1 * | 11/2012 | Geist | G06F 11/3692 |
| | | | 717/125 |
| 2013/0017522 A1 | 1/2013 | Nguyen et al. | |
| 2013/0061209 A1 | 3/2013 | Lam | |
| 2013/0073909 A1 * | 3/2013 | Baudel | G06F 9/44521 |
| | | | 714/38.1 |
| 2013/0111428 A1 | 5/2013 | Begel et al. | |
| 2013/0138701 A1 * | 5/2013 | Jin | G06F 17/30734 |
| | | | 707/803 |
| 2013/0159963 A1 | 6/2013 | Dhalait | |
| 2013/0268912 A1 | 10/2013 | Kizhakkevalappil et al. | |
| 2013/0344859 A1 | 12/2013 | Abramson et al. | |
| 2014/0068559 A1 | 3/2014 | Szocs | |
| 2014/0068567 A1 | 3/2014 | Smith et al. | |
| 2014/0101640 A1 | 4/2014 | Romdhane | |
| 2014/0165208 A1 * | 6/2014 | Chevallier-Mames | G06F 21/14 |
| | | | 726/26 |
| 2014/0173561 A1 | 6/2014 | Toub | |
| 2014/0180961 A1 * | 6/2014 | Hankins | G06Q 10/10 |
| | | | 705/348 |
| 2014/0181794 A1 | 6/2014 | Grawrock et al. | |
| 2014/0208431 A1 * | 7/2014 | Archer | G06F 21/577 |
| | | | 726/25 |
| 2014/0258986 A1 * | 9/2014 | Wang | G06F 11/3684 |
| | | | 717/126 |
| 2015/0082263 A1 * | 3/2015 | Vasudevan | G06F 17/504 |
| | | | 716/106 |
| 2015/0143335 A1 | 5/2015 | Jain et al. | |
| 2015/0178052 A1 | 6/2015 | Gupta et al. | |
| 2016/0098562 A1 | 4/2016 | Hawblitzel et al. | |
| 2016/0179477 A1 | 6/2016 | Bates et al. | |
| 2016/0179479 A1 | 6/2016 | Bates et al. | |
| 2016/0179503 A1 | 6/2016 | Bates et al. | |
| 2016/0179507 A1 | 6/2016 | Bates et al. | |
| 2016/0179508 A1 | 6/2016 | Bates et al. | |
| 2016/0188439 A1 | 6/2016 | Bates et al. | |
| 2016/0188440 A1 | 6/2016 | Bates et al. | |

OTHER PUBLICATIONS

C.K. Luk, et al. "Pin: Building Customized Program Analysis Tools with Dynamic Instrumentation", Intel Corporation, Jun. 12-15, 2005, Website: http://rogue.colorado.edu/Pin, Email: pin.project@intel.com.

Pin—A Dynamic Binary Instrumentation Tool | Intel® Developer Zone; Submitted by Sion Berkowits . . . (/en-us/user/404501) on Wed, Jun. 13, 2012; https://software.intel.com/en-us/articles/pin-a-dynamic-binary-instrument . . . .

Bates et al., "Assertions Based on Recently Charged Code"; U.S. Appl. No. 14/574,473, filed Dec. 18, 2014.

Bates et al., "Assertions Based on Recently Charged Code"; U.S. Appl. No. 14/577,296, filed Dec. 19, 2014.

Bates et al.; "Managed Assertions in an Integrated Development Environment"; U.S. Appl. No. 14/574,488, filed Dec. 18, 2014.

Bates et al., "Assertion Management in an Integrated Development Environment", U.S. Appl. No. 14/577,445, filed Dec. 19, 2014.

Bates et al., "Managing Assertions While Compiling and Debugging Source Code", U.S. Appl. No. 14/585,771, filed Dec. 30, 2014.

Bates et al.; "Managing Assertions While Compiling and Debugging Source Code"; U.S. Appl. No. 14/587,797, filed Dec. 31, 2014.

Bates et al., "Optimizing Program Performance With Assertion Management"; U.S. Appl. No. 14/574,459, filed Dec. 18, 2014.

List of IBM Patents or Patent Applications Treated As Related.

Mirshokraie et al., "JSART: JavaScript Assertion-Based Regression Testing," 2012, M. Brambilla, T. Tokuda, and R. Tolksdorf (Eds.): ICWE 2012, LNCS 7387, pp. 238-252.

(56) References Cited

OTHER PUBLICATIONS

Goloubeva et al., "Soft-error detection using control flow assertions," 2003, 18th IEEE International Symposium on Defect and Fault Tolerance in VLSI Systems, pp. 1-8.

Athavale et al., "Code Coverage of Assertions Using RTL Source Code Analysis," 2014, Proceedings of the 51st Annual Design Automation Conference, pp. 1 -6.

Godefroid et al., "DART: directed automated random testing," 2005, Proceedings of the 2005 ACM SIG PLAN conference on Programming language design and implementation, vol. 40, Issue 6, pp. 213-223.

Ve mu et al., "CEDA: control-flow error detection through assertions," 2006, 12th IEEE International On-Line Testing Symposium, pp. 1-6.

Bieman et al., "Using fault injection to increase software test coverage," 1996, Proceedings., Seventh International Symposium on Software Reliability Engineering, pp. 166-174.

Hangal et al., "Tracking down software bugs using automatic anomaly detection," 2002, Proceedings of the 24th International Conference on Software Engineering, pp. 291-301.

Kamal et al., "Automatic Generation of Assertions to Detect Potential Security Vulnerablitiles in C Programs That Use Union and Pointer Types," 2010, 4th International Conference on Network and System Security (NSS), pp. 351-356.

Drusinksy et al., "Rapid runtime system verification using automatic source code instrumentation," 2011, 6th International Conference on System of Systems Engineering (SoSE), pp. 1-6.

Rothermel et al., "Selecting tests and identfiying test coverage requirements for modified software," 1994, Proceedings of the 1994 ACM SIGSOFT international symposium on Software testing and analysis, pp. 169-184.

Aggrawal et al., "Code coverage based technique for priortizing test cases for regression testing," 2004, ACM SIGSOFT Software Engineering Notes, vol. 29, Issue 5, pp. 1-4.

Srivastava et al., "Effectively priortizing tests in development environment," 2002, Proceedings of the 2002 ACM SIGSOFT international symposium on Software testing and analysis, pp. 97-106.

Rosenblum, "A practical approach to programming with assertions," 2002, IEEE Transactions on Software vol. 21, Issue 1, pp. 19-31, downloaded from the Internet at <Url>http://ieeexplore.ieee.org on Apr. 12, 2017. Engineering.

Tillmann et al., "Parameterized unit testing: theory and practice," 2010, Proceedings of the 32nd ACM/IEEE International Conference on Software Engineering—vol. 2, pp. 484-484, downloaded from the Internet at <Url>http://dl.acm.org on Apr. 12, 2017.

Korel et al., "Assertion-oriented automated test data generation," 1996, Proceedings of the 18th international conference on Software engineering, pp. 71-80, downloaded from the Internet at <Url>http>//dl.acm.org on Apr. 12, 2017.

\* cited by examiner

500

| Assertion ID | A: Priority | B: Average time (in ms) to run this assertion | C: Average number of times executed per program run | Total average time per program run for this assertion (B * C) | Total score (A * B * C) |
|---|---|---|---|---|---|
| 1 | High (1) | 2 | 7 | 14 | 14 |
| 2 | Medium (2) | 5 | 3 | 15 | 30 |
| 3 | Medium (2) | 4 | 1100 | 4400 | 8800 |
| 4 | Low (3) | 10 | 2 | 20 | 60 |
| 5 | Low (3) | 1 | 4000 | 4000 | 12000 |

FIGURE 5

OPTIMIZING PROGRAM PERFORMANCE WITH ASSERTION MANAGEMENT

CROSS-REFERENCE TO RELATED APPLICATION

This application is a continuation of co-pending U.S. patent application Ser. No. 14/574,459, filed Dec. 18, 2014. The aforementioned related patent application is herein incorporated by reference in its entirety.

BACKGROUND

The present invention relates to integrated development environment (IDE) tools, and more specifically, to managing source code assertions in a source code component separately from the component.

Assertions are small segments of source code used to help debug a computer program. An assertion typically specifies a condition used to test whether a program is functioning correctly. If the condition in an assertion evaluates to true, then the program is presumed to be functioning correctly (at least relative to the condition specified in the assertion). In such a case, the assertion does not interfere with program execution, apart from the overhead of testing the condition. However, if the condition in an assertion evaluates to false, the assertion could terminate the program, allow program execution to continue unhindered, throw an exception to leave the erroneous code path, or allow a user to choose how to proceed.

Typically, developers manually include, edit, and remove assertions from source code while developing an application. As developers use assertions to test source code, developers will typically remove assertions from source code during the development process once code is believed to be functioning correctly. However, in some cases, code after an assertion may depend on a variable introduced or process performed within the assertion.

Assertions vary in complexity and the amount of time required to execute a given assertion during run-time. A simple assertion, such as checking the value of a variable (e.g., "assert (i>0)") may have a minimal impact on processing. More complex assertions, such as determining whether the elements of a linked list are in a particular order may use a relatively large amount of processing time. Because processing assertions adds overhead to executing a compiled program which includes the assertions, it may be desirable to remove some assertions before compiling source code into program code.

However, as developers revise source code, some assertions (deleted from source code) may need to be recreated to test the revised code.

SUMMARY

One embodiment of the invention includes a method for managing assertions in source code components of a development project. The method generally includes receiving a request to build a software application generated from the development project. Based on prior executions of the software application, resource requirements for each of one or more assertions included in the prior executions of the software application are identified. Based on the identified resource requirements, one or more assertions are selectively inserted in the source code components. The source code components of the development project are compiled to build the software application.

Another embodiment includes a computer-readable storage medium having instructions, which, when executed on a processor, performs an operation for managing assertions in source code components of a development project. The operation generally includes receiving a request to build a software application generated from the development project. Based on prior executions of the software application, resource requirements for each of one or more assertions included in the prior executions of the software application are identified. Based on the identified resource requirements, one or more assertions are selectively inserted in the source code components. The source code components of the development project are compiled to build the software application.

Still another embodiment includes a processor and a memory storing a program, which, when executed on the processor, performs an operation for managing assertions in source code components of a development project. The operation generally includes receiving a request to build a software application generated from the development project. Based on prior executions of the software application, resource requirements for each of one or more assertions included in the prior executions of the software application are identified. Based on the identified resource requirements, one or more assertions are selectively inserted in the source code components. The source code components of the development project are compiled to build the software application.

BRIEF DESCRIPTION OF THE SEVERAL VIEWS OF THE DRAWINGS

FIG. 5 illustrates an example of measurements used by an IDE to manage assertions in program source code, according to one embodiment.

DETAILED DESCRIPTION

Figure 1:
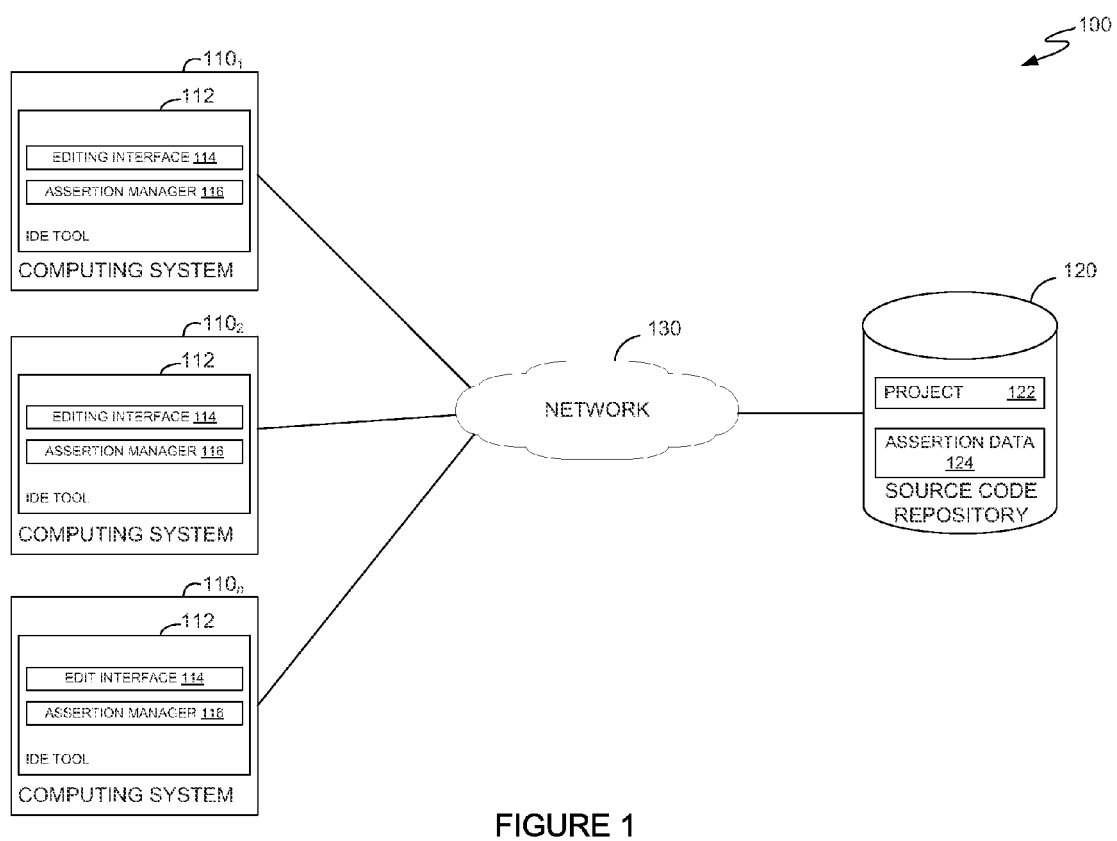
FIG. 1 illustrates an example computing environment, according to one embodiment.

Embodiments presented herein describe techniques for managing assertions outside of program source code. Assertions are features provided by many programming languages that can be used to test conditions before execution of code (i.e., pre-conditions) and after execution of code (i.e., post-conditions). If an assertion fails, program execution can be halted, program execution can continue, the program can throw an exception to leave the erroneous code path, or the program can allow the developer to choose how to proceed. Where program execution is halted or where an exception is thrown can be used to debug the source code; however, assertion failures can provide additional information to aid in debugging.

In one embodiment, an integrated development environment (IDE) tool includes an assertion management component. As discussed in detail below, the assertion management component allows a developer to specify assertions to include in program source code, when compiled. However, in one embodiment, the assertions are not stored in the source code files of an application program. Instead, the IDE tool manages a relationship between a location in program source code where a developer specifies an assertion. Further, the IDE tool manages when that assertion is included in the program code, when compiled. For example, a developer may "activate" or "deactivate" an assertion, as well as properties or parameters used by the IDE tool to determine whether to insert an assertion into program source code, when compiled. When "active" the IDE inserts the assertion into program source code when that code is compiled. When "inactive" the assertion is simply left out of the source code.

The IDE tool may support a variety of programming languages which include assertions. In addition to managing assertions, the IDE may include a text editor and project tools for writing, compiling, and debugging code. In some IDEs, code debugging tools allow developers to step through code execution and view program state, variable values, and other data in a graphical environment.

The assertion manager allows a developer to add, remove, and manage assertions in source code, separately from the source code. To do so, an assertion manager may create associations between code and properties defining an assertion and a location in source code. When code is compiled in the development environment, the assertion manager can insert some or all of the assertions defined through the assertion manager.

In addition to allowing a developer to define assertions managed by the IDE tool, the IDE tool may also manage assertions across users or groups. Some assertions may be particular to a user participating in a project and need not be included when other users compile and test the project. Assertions may also be owned by a group of users, and likewise, need not be included when members of other groups compile and test the project.

Assertions managed by the IDE tool may include a duration in which the assertion is included in compiled code. A developer may define the duration as a fixed date at which the assertion expires or a time offset from the last time the assertion is invoked during code execution. Alternatively, a developer can specify that an assertion is to be run a single time instead of defining a duration in which the assertion is added in compiled code.

The IDE tool may manage which assertions are included in compiled code based on assertion priority and execution time. A developer may define an amount of program execution time allotted to executing assertions. If the assertions take more time to execute than the allotted time, the IDE may selectively remove assertions from future compilations based on the assertion priority and execution time, as described in more detail herein. The IDE may also manage which assertions are included in compiled code based on assertion priority and other resource utilization thresholds, such as the size of compiled code.

Advantageously, managing assertions separately from program source code may streamline program development.

Over time, managing assertions outside of source code may prevent later-developed code from depending on variables or processes defined for assertions. Further, the IDE tool may be configured to add and remove assertions from program source code based on a variety of parameters. For example, the IDE tool may add and remove assertions based on performance (e.g., removing assertions that hinder performance of compiled code) or changes in source code (e.g., inserting or activating assertions based on the location of the change or code that may be affected by the change).

FIG. 1 illustrates an example computing environment 100, according to one embodiment. As shown, the computing environment includes a plurality of computing systems $110_1$-$110_n$, a data store 120, and a network 130. As shown, each client device $110_1$-$110_n$ may be connected with source code repository 120 via a network 130. For example, network 130 may include the Internet, an intranet, a local area network, etc.

Computing system 110 may be a personal computer, workstation, mobile device, or any other computing device able to access network 130. Further, client device 110 may include an integrated development environment (IDE) tool 112 which may be configured to manage assertions outside of program source code, as described herein. As shown, IDE tool 112 includes an editing interface 114 and an assertion manager 116. Editing interface 114 allows a developer to access and edit source code components associated with a development project stored in source code repository 120. Source code components include source code files, modules, functions, libraries, or portions thereof that can be viewed and/or edited in editing interface 114. Assertion manager 116 provides a component of the IDE tool 112 configured to manage assertions separately from the source code, as described in more detail herein.

In some embodiments, the IDE tool 112 may manage assertions on based on the identity of a user or a group of users. Taking a mobile application project as an example, one team may be responsible for a graphical user interface (GUI), while another team may be responsible for modules enabling communication with a central server. The GUI team may be responsible for a different set of source code than the network communications team, and members of each team may independently manage assertions for their respective portions of the project. For example, if a developer interacting with an IDE tool 112 is associated with the GUI team, IDE tool 112 may allow the user to only edit and manage assertions in source code belonging to the GUI team. Development environment 112 may be precluded from showing any files associated with teams outside of the GUI team or may only provide read-only access to those files. Accordingly, an IDE tool used by a developer associated with the GUI team may be configured to prevent the developer from managing assertions in code owned by other development teams.

In one embodiment, source code files for a project are stored in source code repository 120. For example, project 122 may include the various source code files for the project as well as other data for the project. In addition, assertions defined for the source code are also stored in source code repository 120 as assertion data 124. Assertion data 124 may include assertion definitions and relationships between assertion definitions and locations in the source code files included in project 122.

Figure 2:
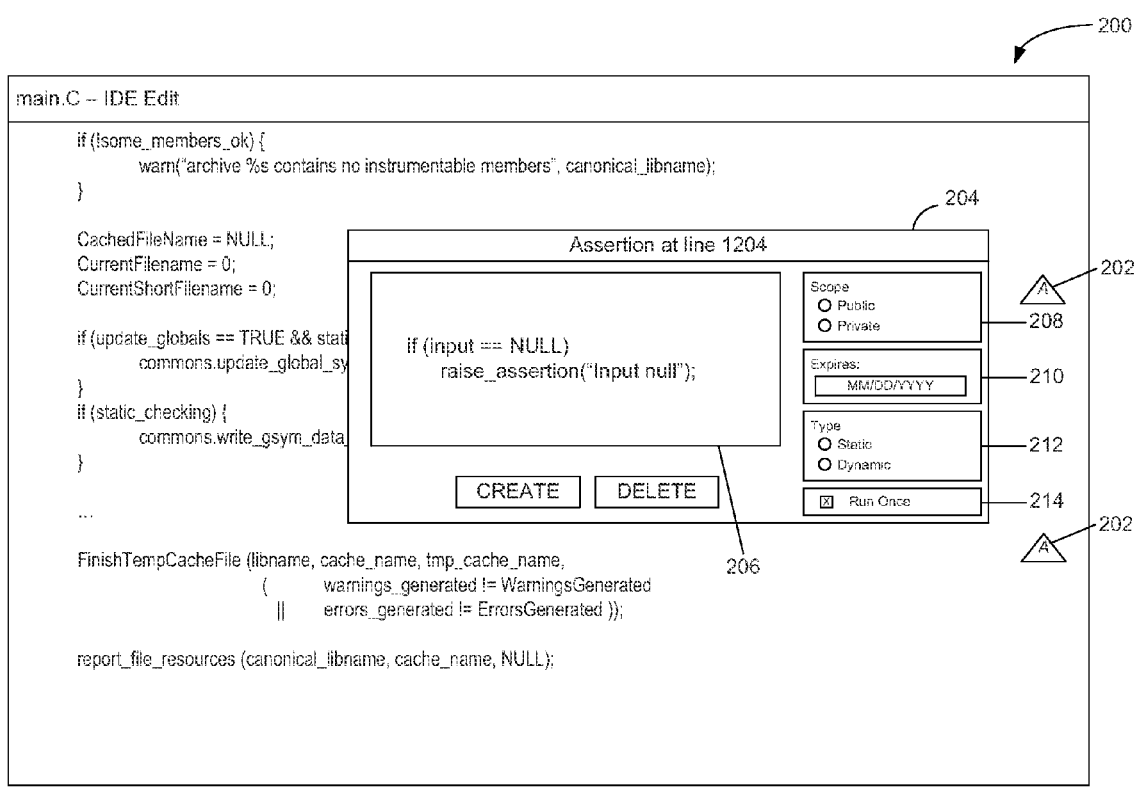
FIG. 2 illustrates an example user-interface of an integrated development environment (IDE) tool, according to one embodiment.

FIG. 2 illustrates an example graphical user interface (GUI) 200 of an IDE tool, according to one embodiment. As illustrated, the interface 200 displays the source code for a file "main.c" being edited by a developer using editing tool 114. The IDE tool allows a developer to include assertions in source code. However, rather than including the content of an assertion inline with source code, the IDE tool may store the assertions separately from the source code file.

Further, when a developer accesses a source code file, the IDE tool (and specifically, the assertion manager) may determine whether any assertions have been defined for that file. If so, the IDE tool may present an indication in the editing interface points in the source code where an assertion has been defined. For example, icons $202_{1-2}$ indicate points in the source code where an assertion has been defined. Specifically, icon $202_1$ indicates that an assertion has been defined for line 1204 of the file "main.c". When the developer compiles the source code in this file, the IDE tool inserts in the source code supplied to a compiler. In some cases, the assertion manager may further determine if the IDE tool should display an assertion and insert the assertion in the source code based on a variety of parameters, such as assertion priority, scope, or other parameters, as described herein.

In one embodiment, the editing interface of the IDE tool will display icons 202 for any assertions that will be included when the source code is compiled. Alternatively, however, the interface could show different icons to indicate whether an assertion is currently "active" or "inactive" (or other properties). GUI 200 may display icons 202 for public assertions, private assertions owned by the user of the GUI, assertions "owned" by a development team, or any combination thereof.

When a developer selects an icon 202, or creates an assertion, the IDE tool displays a dialog box 204 in the GUI. Dialog box 204 prompts a developer to specify source code for the assertion and any parameters used to manage whether the assertion is included in the code at compile time. For example, as shown in FIG. 2, dialog box 204 includes an editing pane 206 used to define the content of an assertion. As illustrated, the assertion at line 1204 checks whether an input is null.

Scope field 208 allows a user to define the scope of an assertion. An assertion may generally be visible to any developer which accesses the source code file, allowing any developer working on the project to view or edit this assertion, as well as include the assertion in the source code at compile-time. In contrast, the IDE tool may present assertions marked as private to only the developer who defined that assertion. In some embodiments, whether an assertion is visible may depend on whether a developer is a member of a given user group. That is, in addition to "private"—all users—and "public"—one user—assertions may be visible to a group of users. Such a scope may allow a team of developers to access an assertion (e.g., the GUI team in the mobile application example above) but prevent other teams of users (e.g., the network team in the mobile application example above) from accessing the assertion.

Field 210 allows a user to define when an assertion expires—that is, when an assertion should not be included in source code when compiled. As shown the expiration is defined as a date. However, the expiration could also be defined as a number of days an assertion should remain active or as a number of days after an assertion last failed. That is, if the assertion does not fail within the defined time period, the assertion manager may stop including the assertion in future compilations of the source code.

Type field 212 allows a user to define if an assertion is static or dynamic. Static assertions are inserted into source code during the compilation process. In contrast, dynamic assertions may be inserted into source as appropriate. The IDE tool may need to manage code executed by an interpreter, such as PERL, Python, or Java code. For projects developed in an interpreted language, dynamic assertions may be inserted into code without requiring recompilation of the code; instead, code defining the dynamic assertion can be provided to an interpreter when execution of the compiled code reaches a specified location.

Run once field 214 allows a user specify that assertion should be run only one time. If selected, the IDE tool includes the assertion in source code only once. For example, for a static assertion, the IDE tool may track whether the assertion has been included in compiled code or whether the project was built and run from the IDE tool (e.g., in a debugging environment). For dynamic assertions, the IDE tool may be configured to insert the assertion at the specified location only once when the source code is passed to runtime engine for interpreted code.

In each of the cases discussed above, the IDE may store the assertions separately from the source code files of a development project. Further, while the above discussion illustrates some parameters (scope, expiration time, type, and run-once), assertions may be defined by additional parameters, some of which are discussed below.

Figure 3:
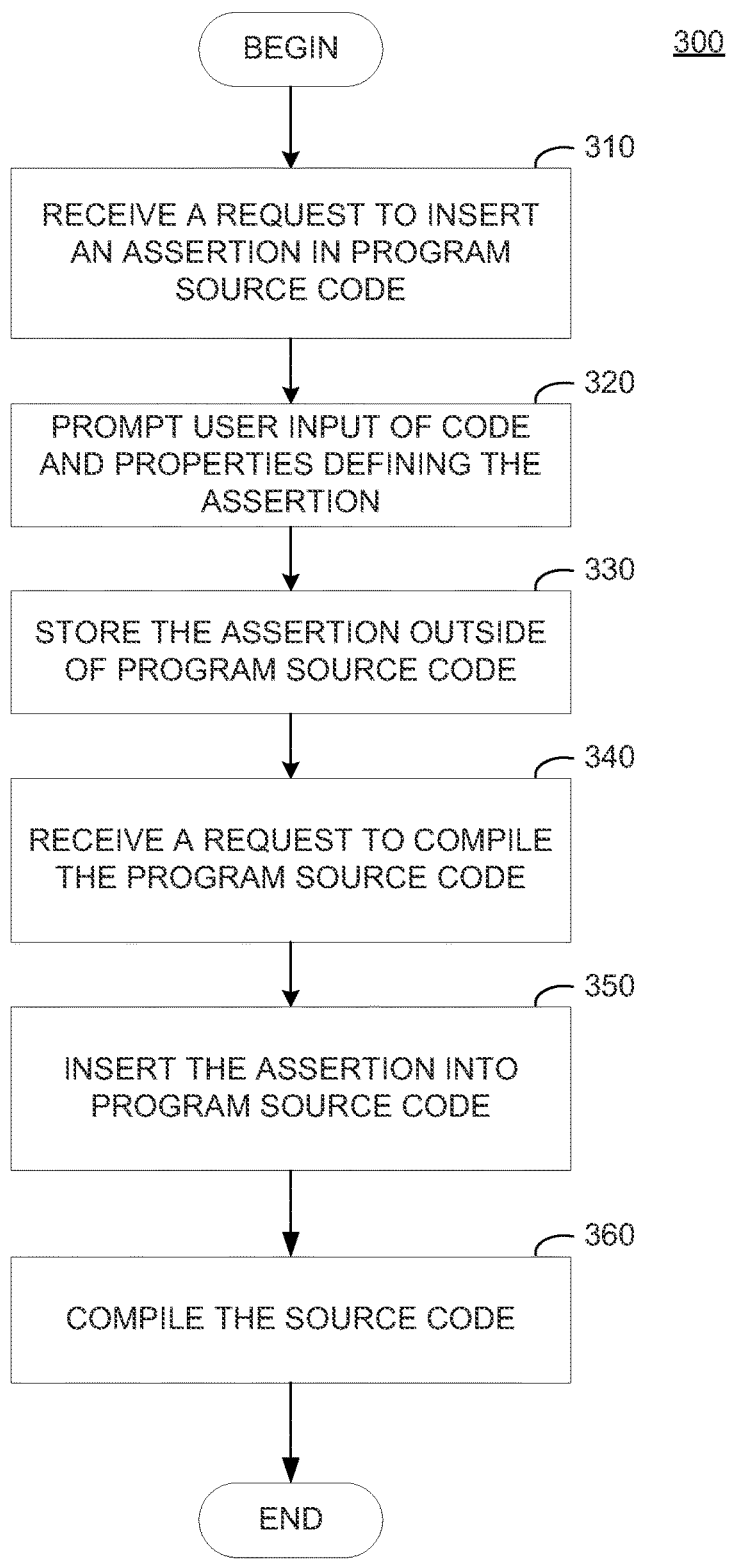
FIG. 3 illustrates a method for defining assertions managed by an IDE tool, according to one embodiment.

FIG. 3 illustrates a method for an IDE tool to manage assertions associated with program source code, according to one embodiment. As shown, method 300 begins at 310, where the IDE tool receives a request to insert an assertion in program source code. The request may be, for example, a keyboard command, selection from a menu, a mouse input, or a combination of inputs.

At 320, the IDE tool, prompts a developer to specify source code for the assertion itself, as well as for any properties to associate with the assertion. As discussed above, the prompt may take the form of a GUI window with fields for specifying the source code for the assertion and any properties to associate with the assertion. As discussed above, the properties may be used by the IDE tool to decide whether to include the assertion in source code at compile time (for static assertions) or runtime (for dynamic assertions).

At 330, once defined, the IDE tool may store the assertion as part of a development project. The IDE tool may further maintain an association indicating the line of source code where the assertion is inserted. As noted, however, the assertion is not included in the source code file. The assertion may be stored, for example, in a database, flat files, or any other appropriate format.

At 340, the IDE tool receives a request to compile the program source code (or project which includes the program source code). In response, the IDE tool identifies assertions associated with the source code, as well as properties of the assertions. The properties are used to determine whether the assertion should be included in the source code. Active assertions are included in source code, while inactive assertions are not. As discussed above, public assertions and assertions belonging to the user or user's group are included, while assertions belonging to other users or groups are not included. At 350, the IDE tool inserts the source code of each assertion into the program source code at the identified locations. At 360, the source code is compiled.

The IDE tool may be configured to monitor when an assertion is run. Once a "run once" assertion is executed, the IDE tool may deactivate the assertion (e.g., by marking the assertion as inactive in an assertion repository). In future compilations, the IDE tool determines that the assertion has already been run and does not insert the assertion into source code for compilation. For other assertions, the IDE tool may track and record "last ran" data for the assertion. Based on the "last ran" date, the IDE determines if an assertion was last run within a specified time window, as described above. If the "last run" date is outside of the specified time window, the IDE does not insert the assertion into source code when the project or source code file is compiled.

Figure 4:
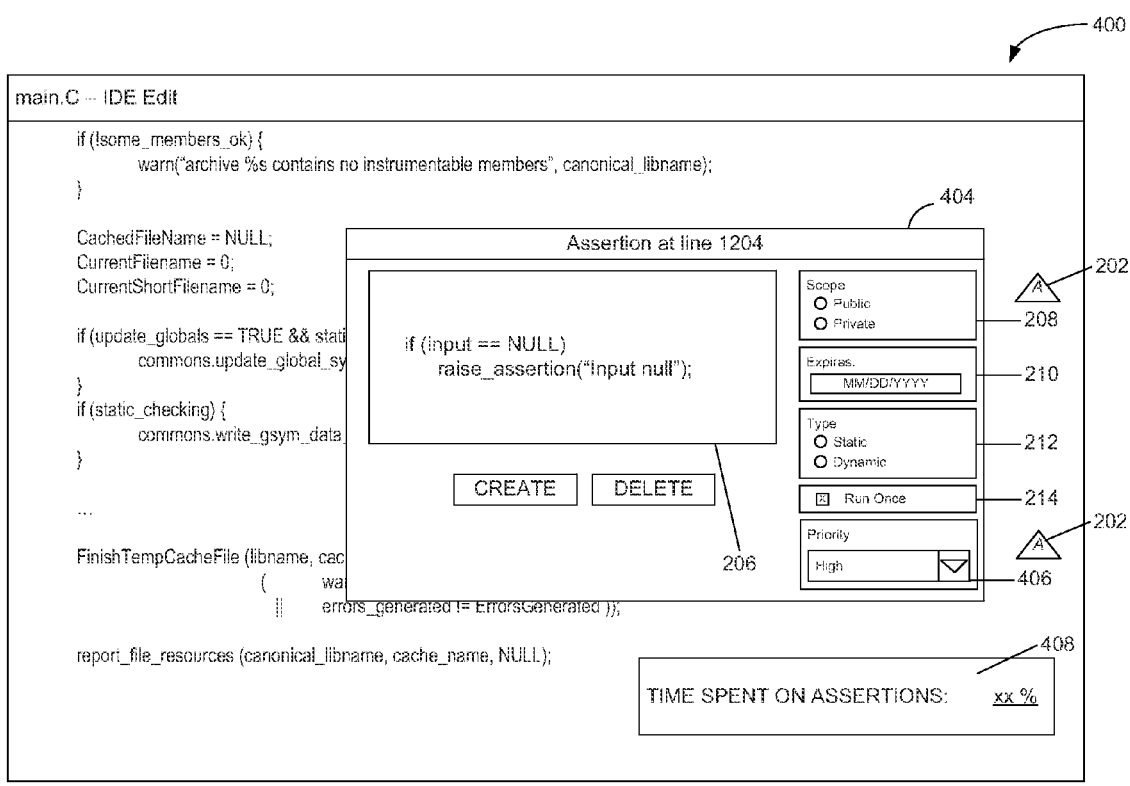
FIG. 4 illustrates an example user-interface of an IDE tool, according to one embodiment.

FIG. 4 illustrates an example user-interface interface 400 of an IDE tool, according to one embodiment. As with user-interface 200, user interface 400 displays source code of a file, icons 202 indicating points in the source code which are associated with an assertion, and a dialog box 404. Dialog box 404 includes an editing pane 206, in which a developer defines the content of an assertion. Dialog box 404 also includes a scope field 208, expiration field 210, assertion type field 212, and "run once" field 214, as described above with respect to FIG. 2.

In addition to the parameters shown in dialog box 204 of FIG. 2, dialog box 404 includes a field 406 for specifying a priority level for an assertion. In some cases, priority definitions can be relatively coarse, such as providing options to define an assertion as low, medium, or high priority. In other cases, priority definitions can allow for finer control of assertion priority.

As shown, user interface 400 also includes a field 408, which allows a user to specify a utilization constraint. The utilization constraint defines an amount of resources available for assertions inserted into code. In some cases, a user may define a percentage of time evaluating assertions in compiled code. However, resource utilization may be defined using any appropriate resource utilization metric (e.g., memory usage).

FIG. 5 illustrates an example table of assertions and a score for each assertion. In one embodiment, the scores and priority are used to manage what insertions are included in compiled code based on assertion priority and resource availability. As illustrated, each assertion is associated with a priority, an average time to run the assertion, an average number of times the assertion has been executed each time the compiled code is run, a total average time per program run for each assertion, and a total score. The total score may be based on the priority of an assertion, an average time to run the assertion, and an average number of times the assertion is run during execution. As illustrated, a multiplier may be used to weight assertion score based on priority.

The IDE tool may select which assertions to include in future compilations of the project based on the score for each assertion and the utilization constraint. The utilization constraint can be a maximum utilization for all assertions included in the source code or can be a maximum utilization for each assertion individually. Using the table illustrated in FIG. 5, and assuming that a developer has specified a utilization constraint of executing all assertions within 8000 ms, the IDE can determine that Assertion 5 should be removed from the executable the next time the program is compiled. While Assertion 3 uses more program execution time (a total of 4400 ms versus 4000 ms used by Assertion 5), the lower priority for Assertion 5 increases the score for Assertion 5 above the score for Assertion 3. After compiling and executing the updated executable does not include Assertion 5. The IDE continues to gather (and update) resource utilization data compared to the threshold. If the assertion resource utilization exceeds the utilization constraint, the IDE can proceed to remove more assertions based on the total score. Using the table illustrated in FIG. 5 as an example, the next assertion to be removed would be Assertion 3, followed by Assertion 4, Assertion 2, and Assertion 1, respectively. Assuming that a developer has specified a utilization constraint of executing each assertion individually within 3000 ms, the IDE can determine that Assertions 3 and 5 should be removed from the executable the next time the program is compiled.

Figure 6:
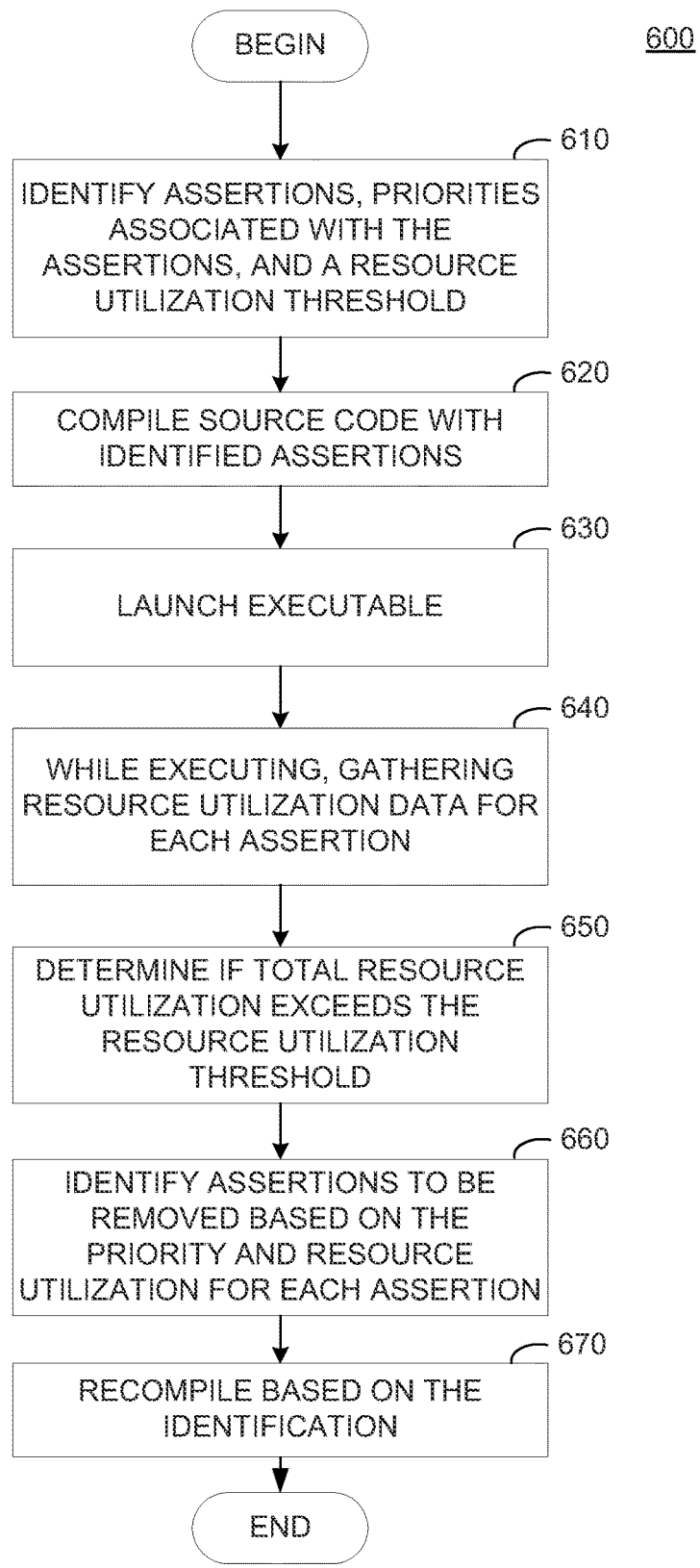
FIG. 6 illustrates a method for an IDE to manage assertions in program source code based on assertion priority, according to one embodiment.

FIG. 6 illustrates a method for managing assertions based on priority and resource utilization, according to one embodiment. As shown, method 600 begins at 610, where the IDE tool identifies assertions, priorities associated with the assertions, and a resource utilization threshold. As described above, the resource utilization threshold may be an amount or percentage of program execution time or some other resource utilization metric. At 620, the IDE compiles the source code with the identified assertion, and at 630, the IDE executes a program compiled from the source code (or from compiling the project which includes the source code).

At 640, while executing the program, the IDE captures resource utilization data for each assertion. Resource utilization data may be logged, for example, in flat files, a database, or using any other appropriate logging method. Resource utilization data may be logged over one or multiple executions of the executable.

At 650, the IDE determines if total resource utilization exceeds the resource utilization threshold. For example, determining that resource utilization exceeds the threshold may entail determining the total amount of execution time for the executable, the amount of execution time used to process the assertions, and determining the percentage of the total execution time was used for processing the identified assertions. If resource utilization for the identified assertions exceeds the threshold, the IDE identifies assertions to remove at 660. Assertion removal may be based on priority and resource utilization for each assertion. At 670, the IDE recompiles the source code, but does include assertions below the priority/resource levels.

In some cases, assertions may be managed based on program size. If an executable exceeds a pre-defined size, one or more assertions may be removed to reduce the size of the executable below the pre-defined size. For example, the assertion, a table may be defined that correlates assertion priority and the size of each assertion (e.g., in bytes). As with managing assertions based on processing time, the IDE can identify assertions to remove in subsequent compilations of source code. Managing assertions based on priority and program size may be used, for example, in embedded systems, or systems where minimizing executable size is important.

In one embodiment, assertions which have been removed or disabled may be "reactivated" based on changes to the program source code. For example, assertions may be defined with an expiration date, an active time period, or marked as "run once." In each case, once the conditions specified with that assertion have been satisfied, the IDE tool may mark the assertion as inactive. Once the assertion is marked as inactive, the IDE tool no longer considers that assertion as a candidate to be included in program source code when compiled. In some cases, the time the assertion remains active may be related to code complexity. Assertions associated with more complex code may have a longer active duration than assertions associated with less complex code. The IDE tool may determine code complexity based on, for example, the history of the code and defects found in the code or by user assessment of code complexity. Other methods for determining code complexity may be based on, for example, the size of the changed code (assuming that as the amount of changed code changes, the chance for problems to arise in code increases), a number of cross-component interactions, or the frequency the changed code is used.

Figure 7A:
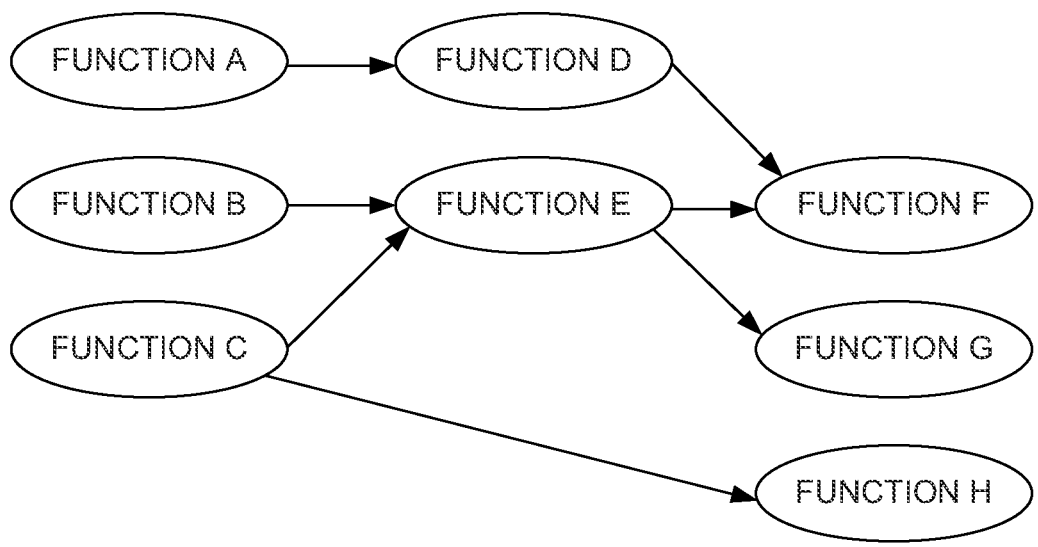
FIGS. 7A-7B illustrate example of function call graphs used by an IDE to identify assertions in modified source code to activate, according to one embodiment.
Figure 7B:
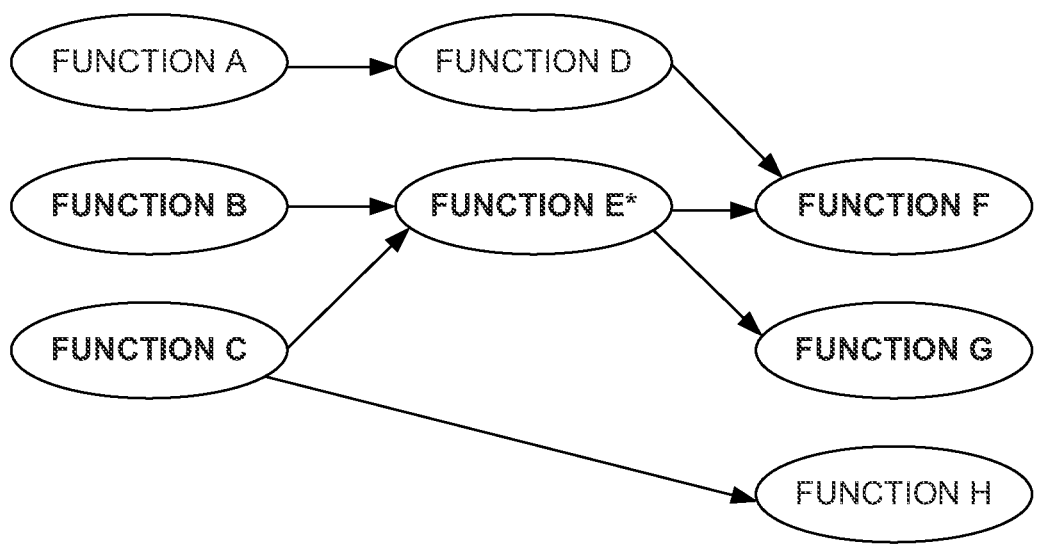

In one embodiment, the IDE tool may activate assertions after assertions have expired or otherwise been deactivated. For example, when code changes, the IDE tool may identify assertions to activate in the changed file and importantly for other files as well. An example of this is illustrated in FIGS. 7A and 7B, which illustrate example dependency graphs (or call graphs) showing a plurality of functions. As used herein, the term "function" includes any method, unit method, member, procedure, etc. that is called by name in program source code. As illustrated, Function A calls Function D, which then calls Function F. Functions B and C call Function E, which then calls Functions F and G. Function C also calls Function H. As illustrated in FIG. 7B, Function E* represents a change to the source code of Function E. Based on the dependencies, the IDE tool may activate certain assertions. For example, the IDE tool may activate assertions for Function E* (the changed function), Functions B and C (which call Function E*), and Functions F and G (which are called by Function E*).

For example, in Functions B and C, the IDE tool may only activate assertions in code after Function E* is called and slightly before Function E* is called. In some cases, the IDE can activate assertions in more than the immediate dependents of a changed function. For example, assertions may be activated for the functions that call Functions B and C. Determining functions in which assertions may be activated may be based, for example, on code complexity.

In one embodiment, the IDE tool may evaluate code coverage information to determine which assertions should be activated. Coverage information tracks a number of lines of code before and after a specified location. Using the set of predecessor and successor lines based on the location of a code change, an IDE can identify the assertions to be activated.

Figure 8:
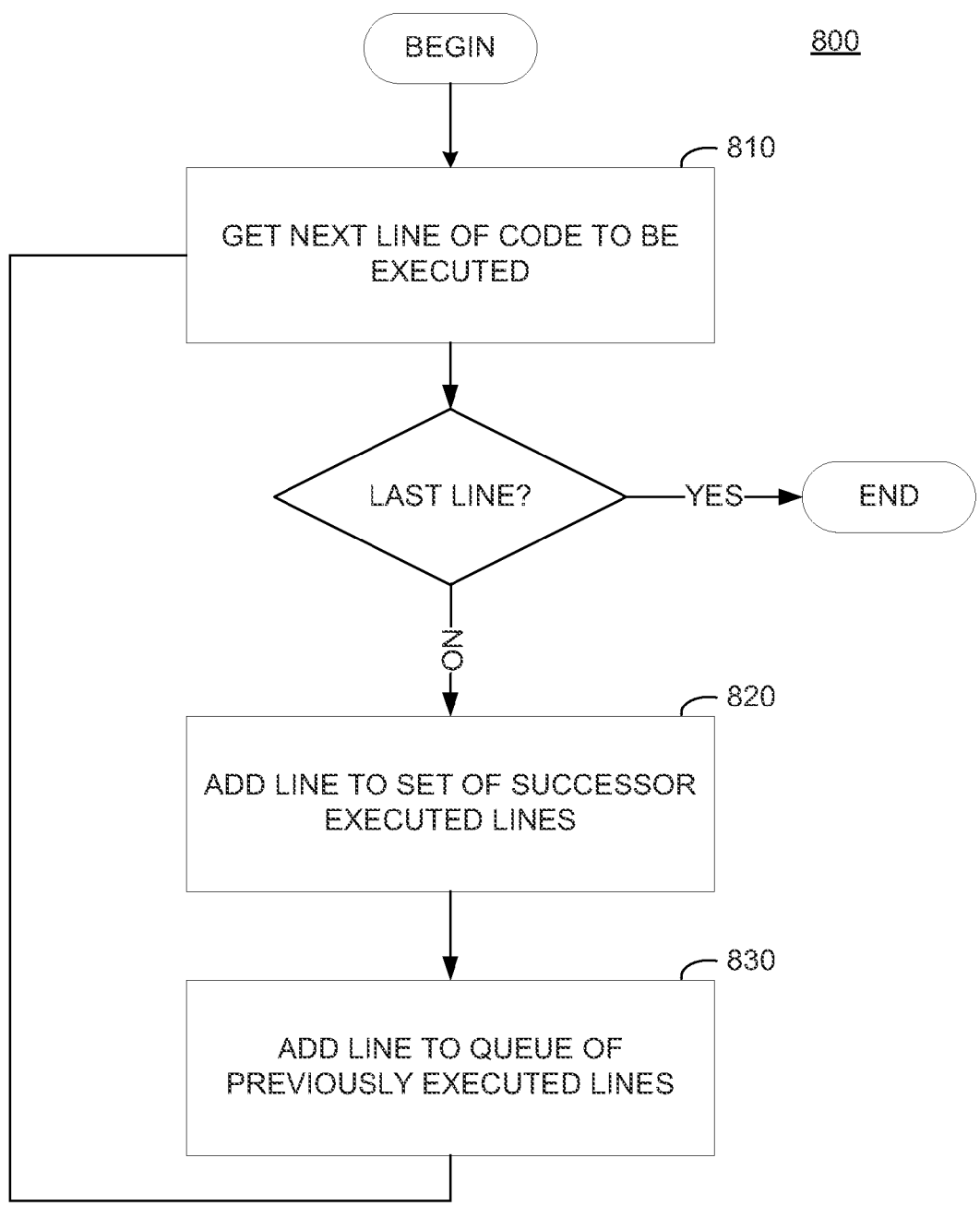
FIG. 8 illustrates an example flow diagram for determining code coverage, according to one embodiment.

FIG. 8 illustrates a method for determining code coverage, which may be used to determine assertions to be activated. When source code of a project file is changed, the IDE tool can use code coverage information to identify a predecessor set of code (code before a modified element) and a successor set of code (code after a modified element). The IDE tool can activate assertions associated with code in the predecessor and successor sets of code that are not currently active. Method 800 begins at 810, where a next line of code to execute is retrieved. If the line is the last line, method 800 ends. If not, at 820, the line is added to a set of successor executed lines of code. At 830, the line is added to a queue of previously executed lines. In adding the line to a queue of previously executed lines, the oldest line may be pushed out of the queue to allow for adding the line to the queue.

In another embodiment, the IDE tool adds or reactivates assertions based on reaching definition data within debug data. A given instruction creates a reaching definition if the instruction reaches another instruction without an intervening variable assignment. If a source code location is changed and definitions are created by this changed code, assertions can be added or activated at any location these definitions reach. In some cases, assertions for the starting reaching point may also be activated.

In still further embodiments, the IDE may allow users to select assertions to activate. For example, the IDE tool may allow a user to change a function in a source code file and manually specify that an assertion should be activated for a specified period of time.

Figure 9:
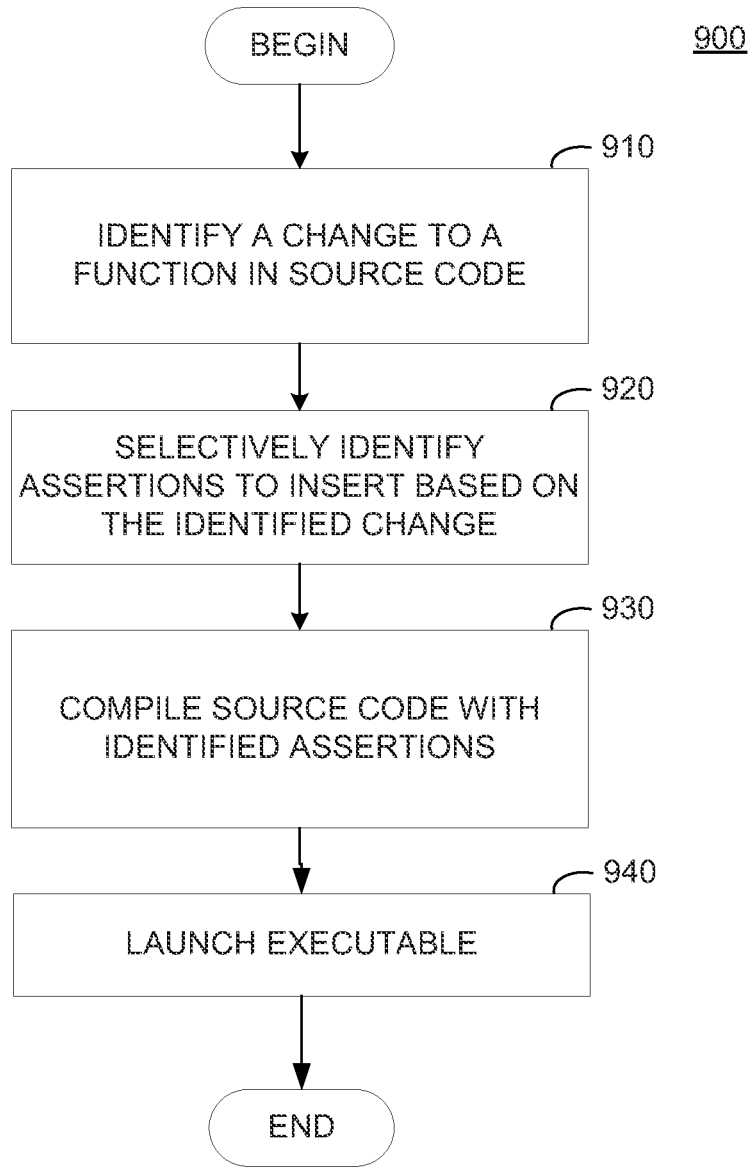
FIG. 9 illustrates a method for an IDE to manage assertions in program source code based on changes to the program source code, according to one embodiment.

FIG. 9 illustrates a method for activating assertions based on code changes. Method 900 may begin at 910, where the IDE identifies a change to at least one line of source code in a project having managed assertions. At 920, the IDE tool selectively identifies assertions to insert based on the change. As discussed above, the selective identification may be based on dependency graphs (or call graphs), coverage information, reaching definitions, or manual input. At 930, the IDE tool inserts any assertions selected at step 920 and compiles the source code. At 940, the IDE launches the complied program.

Figure 10:
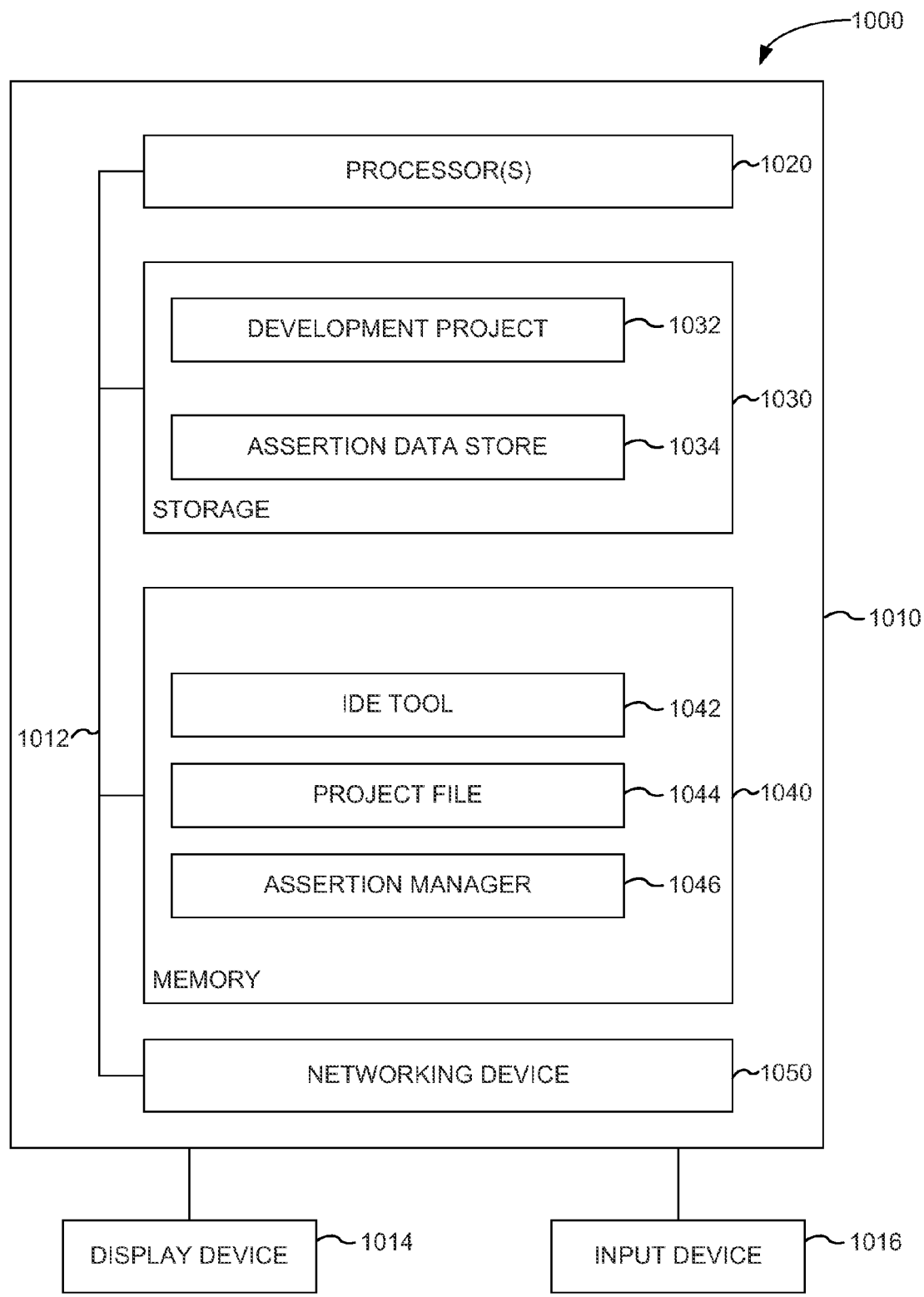
FIG. 10 illustrates an example computing system, according to one embodiment.

FIG. 10 illustrates an example computing system 1000, according to an embodiment of the present invention. As shown, computing environment 1000 includes computer system 1010. Computer system 1010 is included to be representative of existing computer systems, e.g., desktop computers, server computers, laptop computers, tablet computers and the like. However, embodiments of the invention are not limited to any particular computing system, application, device, or network architecture and instead, may be adapted to take advantage of new computing systems and platforms as they become available. Further, although FIG. 1 illustrates a single computer system, those skilled in the art will recognize that embodiments of the invention may be adapted for use on multiple systems configured to communicate over a network. Additionally, those skilled in the art will recognize that the illustration of computer system 1010 is simplified to highlight aspects of the present invention and that computing systems and data communication networks typically include a variety of additional elements not shown in FIG. 1.

As shown, computer system 1010 includes one or more processors 1020, a storage device 1030, memory 1040, and a networking device 1050, all connected by a bus 1012. Computer system 1010 may be connected to one or more display devices 1014 and one or more input devices 1016. User input devices 1016 may include a mouse pointing device, a keyboard, pen input devices, and the like. Display devices 1014 may include CRT monitors, LCD displays, projectors, and the like. The processing activity and hardware resources on computer system 1010 may be managed by an operating system (not shown). Network device 1050 may connect computer system 1010 to a data communications network, including both wired and wireless networks.

Storage device 1030 may store application programs and data for use by computer system 1010. Typical storage devices include hard-disk drives, flash memory devices, optical media, network and virtual storage devices, and the like. As shown, storage device 1030 contains a development project 1032 and an assertion data store 1034. Development project 1032 may contain a variety of files including source code, compilation configuration files, debugging information, and other artifacts used to develop a software application. Assertion data store 1034 may be, for example, a database, a series of flat files, or some other appropriate data repository.

As shown, memory 1040 stores an IDE tool 1042, a project file 1044, and an assertion manager 1046.

IDE tool 1042 provides a programming environment that assists a computer programmer in developing software. IDE tool 1042 may include a source code editor, a compiler and/or interpreter, build-automation tools, and a debugger (not shown). Other components provided by IDE tool 1042 may include a version control system, a class browser, an object inspector and, a class hierarchy diagram generator, etc.

Project file 1044 represents a file included in development project 1032 that is being edited by a developer using IDE tool 1042 (e.g., a source code file of a software application). IDE tool 1042 may display the text of the source code to the developer on display device 1014 and provide an interface that allows the user to edit project file 1044.

Assertion manager 1046 manages assertions in project file 1044. Assertion manager 1046 may interact with assertion data store 1034 to add or modify assertions stored outside of source code in a project file 1044 and development project 1032. Rather, the IDE tool stores the source code and parameters for each assertion in storage device 1030 as assertion data and maintains data sufficient to identify the source code files and locations in source code associated with the each assertion. During execution of a program compiled from development project 1032, assertion manager 1046 may monitor the performance of assertions in an executable and determine assertions to be removed from program source code, as described herein. Further, assertion manager 1046 may monitor for changes in source code and activate assertions based on the changes to source code, as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the integrated development environment) or related data available in the cloud. For example, the integrated development environment could execute on a computing system in the cloud to management assertions outside of program source code. In such a case, the IDE could manage assertions outside of program source code and store information defining such assertions at a storage location in the cloud at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for managing assertions in source code components of a development project, comprising:
   receiving a request to build a software application generated from the development project;
   identifying, based on prior executions of the software application, resource requirements for each of one or more assertions included in the prior executions of the software application;
   calculating a score for each of the one or more assertions using at least the identified resource requirements and a priority associated with each of the one or more assertions;
   selectively inserting, in the source code components, one or more of the assertions based on the determined scores for each of the one or more assertions;
   while gathering and updating resource utilization data, identifying the score of at least one of the assertions in the source code components that exceeds a threshold score for retaining assertions in the source code components;
   removing the identified assertion from the source code components; and
   compiling the source code components of the development project to build the software application.

2. The method of claim 1, wherein the assertion specifies one or more lines of source code to insert at a specified location in one of the source code components.

3. The method of claim 1, further comprising:
   executing the compiled software application;
   during execution, monitoring resource used by the assertions inserted into the source code components; and
   updating the resource requirements for the assertions inserted into the source code components and executed during execution.

4. The method of claim 1, wherein the resource requirements identify a processing time required to execute one or more of the assertions, wherein a resource utilization constraint specifies an amount of time available to execute assertions, and wherein selectively inserting the one or more of the assertions comprises selecting a set of the one or more assertions, the set having a total resource requirement below the resource utilization constraint.

5. The method of claim 4, wherein the resource requirement identifies a size of each assertion, and wherein the resource utilization constraint comprises a maximum size of assertions to insert into the source code component.

\* \* \* \* \*